(12) United States Patent
Liu

(10) Patent No.: US 11,408,942 B2
(45) Date of Patent: Aug. 9, 2022

(54) METHOD FOR PREDICTING SERVICE LIFE OF RETIRED POWER BATTERY

(71) Applicant: CHANGSHA UNIVERSITY OF SCIENCE & TECHNOLOGY, Hunan (CN)

(72) Inventor: Zhiqiang Liu, Hunan (CN)

(73) Assignee: CHANGSHA UNIVERSITY OF SCIENCE & TECHNOLOGY, Changsha (CN)

(*) Notice: Subject to any disclaimer, the term of this patent is extended or adjusted under 35 U.S.C. 154(b) by 0 days.

(21) Appl. No.: 17/546,988

(22) Filed: Dec. 9, 2021

(65) Prior Publication Data

US 2022/0099753 A1 Mar. 31, 2022

Related U.S. Application Data

(63) Continuation of application No. PCT/CN2020/115519, filed on Sep. 16, 2020.

(30) Foreign Application Priority Data

Sep. 26, 2019 (CN) .......................... 201910914866.6

(51) Int. Cl.
*G01R 31/392* (2019.01)
*G01R 31/367* (2019.01)
(Continued)

(52) U.S. Cl.
CPC .......... *G01R 31/392* (2019.01); *G01R 31/367* (2019.01); *G01R 31/374* (2019.01); *G06F 30/20* (2020.01); *H02J 7/005* (2020.01)

(58) Field of Classification Search
CPC .. G01R 31/392; G01R 31/367; G01R 31/374; G06F 30/20; H02J 7/005
See application file for complete search history.

(56) References Cited

U.S. PATENT DOCUMENTS

| | | | |
|---|---|---|---|
| 2010/0094575 A1* | 4/2010 | Andrieu | H01M 10/486 324/427 |
| 2013/0241567 A1* | 9/2013 | Boehm | G01R 31/392 324/434 |

(Continued)

FOREIGN PATENT DOCUMENTS

| | | |
|---|---|---|
| CN | 106597305 A | 4/2017 |
| CN | 108037463 A | 5/2018 |

(Continued)

OTHER PUBLICATIONS

International Search Report of PCT/CN2020/115519.

(Continued)

*Primary Examiner* — Mohammad K Islam
(74) *Attorney, Agent, or Firm* — Dragon Sun Law Firm, PC; Jinggao Li, Esq.; Nathaniel Perkins

(57) ABSTRACT

This invention discloses a method for predicting the service life of a retired power battery. The service life of a retired power battery may be predicted by its power battery life attenuation curve. The power battery life attenuation curve is obtained by establishing a power battery life model and a charge and discharge characteristic curve of the power battery by utilizing the temperature T, the discharge rate C and the discharge depth DOD in the charging and discharging process of the power battery. This invention establishes a three-dimensional relation graph with a cycle life with respect to the capacity loss rate and the functional relationship ω=ƒ(T,C) by using the power battery life attenuation curve. The three-dimensional relation graph is applied to the same type of battery. And the attenuation of the battery in the full life cycle may be predicted.

4 Claims, 9 Drawing Sheets

(51) Int. Cl.
*G01R 31/374* (2019.01)
*G06F 30/20* (2020.01)
*H02J 7/00* (2006.01)

(56) References Cited

U.S. PATENT DOCUMENTS

| | | | | |
|---|---|---|---|---|
| 2015/0377977 | A1* | 12/2015 | Yazami | H01M 10/48 |
| | | | | 324/426 |
| 2016/0259010 | A1* | 9/2016 | Syouda | G01R 31/367 |
| 2017/0205468 | A1* | 7/2017 | Park | G01R 31/396 |
| 2017/0343612 | A1* | 11/2017 | Tagade | G01R 31/367 |

FOREIGN PATENT DOCUMENTS

| | | |
|---|---|---|
| CN | 108919129 A | 11/2018 |
| CN | 110750874 A | 2/2020 |
| JP | 2013134250 A | 7/2013 |

OTHER PUBLICATIONS

Written Opinion of PCT/CN2020/115519.
Youlan Zou, "Modeling and Parameter Estimation of Retired Lithium-ion Power Battery Based on Capacity, resistance and the State of Charge" (China Doctoral Dissertations Full-Text Database, Engineering Science and Technology II), Dec. 15, 2014.
Yingzhi Cui, "State of Health Diagnosis and Lifetime Prediction Method of LiCoO2/MCMB Lithium Ion Batteries", (China Doctoral Dissertations Full-Text Database, Engineering Science and Technology II), Jan. 15, 2019.

\* cited by examiner

METHOD FOR PREDICTING SERVICE LIFE OF RETIRED POWER BATTERY

CLAIM OF PRIORITY

This application claims priority to Chinese Patent Application No. 201910914866.6, filed Sep. 26, 2019, the entire content of which is fully incorporated herein by reference.

TECHNICAL FIELD

This invention relates to the field of battery management of new energy vehicles, and in particular to a method for predicting service life of retired power battery.

BACKGROUND

When the remaining capacity of a power battery of a new energy vehicle is reduced to 70-80% of its initial capacity, a vehicle-mounted service requirement may not be met, and the power battery may be classified as a retired power battery. However, after testing, screening, recombining, etc., the retired power battery may still be used in vehicles or devices with low battery performance requirements.

Typically, power battery life tests comprise a cycle life test and a calendar life test, but a service life prediction model mostly provides for the cycle life or the calendar service life. However, the actual service life of the battery is influenced by cycle working conditions and the calendar service life. Moreover, the service life of the battery may be affected by a change in the environment of the battery application, as the temperature and the discharge system used for power battery life tests may be different. Thus, service life prediction of a power battery is a very complex process. In industry, if a large number of experiments are carried out on each retired power battery to determine the remaining life of the retired power battery, production efficiency may be greatly affected. Therefore, it is desirable to establish a simple and effective retired power battery remaining life prediction model using a small number of tests.

SUMMARY

In order to solve the aforementioned problem of complex service life prediction of a power battery, disclosed herein is a method and system for predicting a service life of a retired power battery. The method firstly establishes a three-dimensional prediction model of the remaining life of a power battery, and subsequently feeds back to a three-dimensional model without being computationally intensive. The detailed scheme of the method is as follows:

The method for predicting service life of retired power battery comprises the following steps: Step 1, taking a plurality of power batteries as an experimental group, performing charge and discharge cycles at different discharge rates and different temperatures respectively, recording a cycle life experiment value and remaining capacity of a power battery after the charge and discharge cycles, and drawing a discharge characteristic curve under each working condition of the power battery; Step 2, respectively calculating capacity loss rate of the power battery in the experimental group under the cycle life and the working conditions, according to the remaining capacity of the power battery; Step 3, establishing a life attenuation curve under each working condition according to the cycle life experiment value recorded in Step 1 and the capacity loss rate obtained in Step 2; Step 4, establishing a life prediction model according to factors influencing the service life of the power battery, and fitting the life prediction model with the life attenuation curve; Step 5, according to the fitted curve in Step 4, the cycle life corresponding to the capacity loss rate under each working condition is obtained; Step 6, establishing a three-dimensional graph of the product of the discharge rate and the temperature, the capacity loss rate and the cycle life; Step 7, when solving the remaining service life of a same-type power battery, calculating the capacity loss rate and the product of the discharge rate and the temperature under the actual working condition, then substituting the product into the three-dimensional graph to obtain the cycle life, and then solving the difference between the cycle life and the nominal life to obtain the remaining life;

Further, the solving formula of capacity loss rate in Step 2 is $Q_{loss}=\Delta Q/Q_\tau \times 100\%$, $Q_{loss}$ is the capacity loss rate, $\Delta Q$ is the capacity attenuation amount of the battery, and $Q_\tau$ is rated capacity of the power battery; and the capacity attenuation amount of the battery is obtained by the formula: $\Delta Q=Q_\tau-Q_n$, and $Q_n$ is the remaining capacity of the battery after the cycle of n times.

Further, the process for establishing the service life attenuation model in Step 4 is as follows: S1, considering factors that affect the cycle life of the response power battery, including the temperature T, the discharge rate C and the discharge depth DOD; S2, determining that the discharge depth DOD is 100%, and establishing a power battery cycle life model: $Q_{loss}=f(T,C,t)$; S3, according to characteristics of a power battery cycle life attenuation rule conforming to a power function, establishing a power exponential model: $Q_{loss}=x^\mu+d$, the d is a constant of temperature; S4, based on the influence of temperature, further establishing a mathematical model: $Q_{loss}=B \cdot e^{(K_a K_T K_C + b)} \cdot Q^\alpha + d$, the B is a coefficient, $K_\alpha$ is a function related to the activation energy, $K_T K_C$ is the function $Q_{loss}$ which is affected by the temperature T and the discharge rate C, $\alpha$ is a power function factor, Q represents the discharge capacity $Q=n \cdot C$ in the experiment, and T represents the thermodynamic temperature and b is a constant; S5, according to the value of the power function factor $\alpha$ and the activation energy a, $\alpha=0.287$, $a=3116-170 \cdot C$, and determining the battery life prediction model: $Q_{loss}(f)=Be^{(-lg(3116-170 \cdot C)) \cdot T \cdot C}(n \cdot C)^{0.287}+c$, the c is the constant.

Further, the establishing of the three-dimensional graph in Step 6 comprising the steps of: drawing a three-dimensional scatter diagram by using the MATLAB, the three-dimensional scatter diagram is about the product of the discharge rate and the temperature, the capacity loss rate and the cycle life; fitting the three-dimensional scatter diagram into a three-dimensional graph by using interpolation.

Further, the calculation formula of the remaining life in Step 7 is as follows: $N_{remain}=N_{nominal}-N$, the $N_{nominal}$ is the nominal life, and the N represents the cycle life.

The beneficial effects of the invention are as follows:

The method of the present invention draws a three-dimensional relationship graph of the product factor ω of the discharge rate and the temperature, the capacity loss rate $Q_{loss}$ and the cycle life N. When a power battery is in a practical application, the remaining life of the power battery can be quickly obtained by only measuring the capacity loss rate and the value of ω. The product factor ω, $\omega=T^*C$, are introduced as parameters, and the same effect can be achieved, no matter how different the T or C are, when the actual T*C is the same as the T*C in the service life prediction model under the corresponding working condition.

In addition, the service life prediction model is established on the basis of an original model, and takes into account the influence of temperature, discharge rate and power battery activation energy. The power battery life prediction model and the experiment value are fitted, and the remaining life prediction accuracy of the power battery is greatly improved.

DETAILED DESCRIPTION

The method for predicting the service life of the retired power battery is further described in detail below with reference to the accompanying drawings.

With a 100 Ah LFP battery, for example, an experimental group is arranged, and due to the poor high-temperature characteristic of the LFP battery, the reaction of the LFP battery causes dissolution of electrode material, and after the electrode material is dissolved, the negative electrode may be embedded and further cause serious damage to the negative electrode active material. Query data indicates that the optimal temperature condition of the LFP battery ranges from 0-65° C., and therefore the temperature range of the experimental group is set at 0-60° C.

The discharge rate is set to be 1 C, 3 C and 5 C, the experimental temperature is set to be 0° C., 10° C., 20° C., 30° C., 40° C., 50° C. and 60° C. The product factor $\omega = f(T,C) = T \cdot C$ of the temperature and discharge rate has 21 different working conditions. Charge and discharge cycles are carried out on the power battery under the 21 different working conditions, a cycle life experiment value (with n cycles) and the remaining capacity of the power battery after the cycles are recorded; and a discharge characteristic curve is drawn under each working condition of the power battery. The discharge characteristic curve of a power battery is one method for determining the performance of a power battery. The working voltage varies with time. The discharge characteristic curve is a curve drawn by the change of the voltage U and the capacity Q when the battery is discharged.

The discharge characteristic curve is established under the conditions of different discharge depths in the present embodiment, and the present disclosure shows that the voltage influence under different discharge depths conditions on the discharge platform of the battery has little impact on the experiment. In the subsequent step, the preset discharge depth of the experimental condition is 100%.

According to the remaining capacity of the power battery, the working conditions and the capacity loss rate $Q_{loss}$ of the power battery in the experimental group under the cycle life is calculated. $Q_{loss} = \Delta Q/Q_\tau \times 100\%$, $\Delta Q = Q_\tau - Q_n$, where $\Delta Q$ is a capacity attenuation amount of the power battery, $Q_\tau$ is a rated capacity of the power battery, and $Q_n$ is the remaining capacity of the battery after the cycle of n times.

Figure 1:
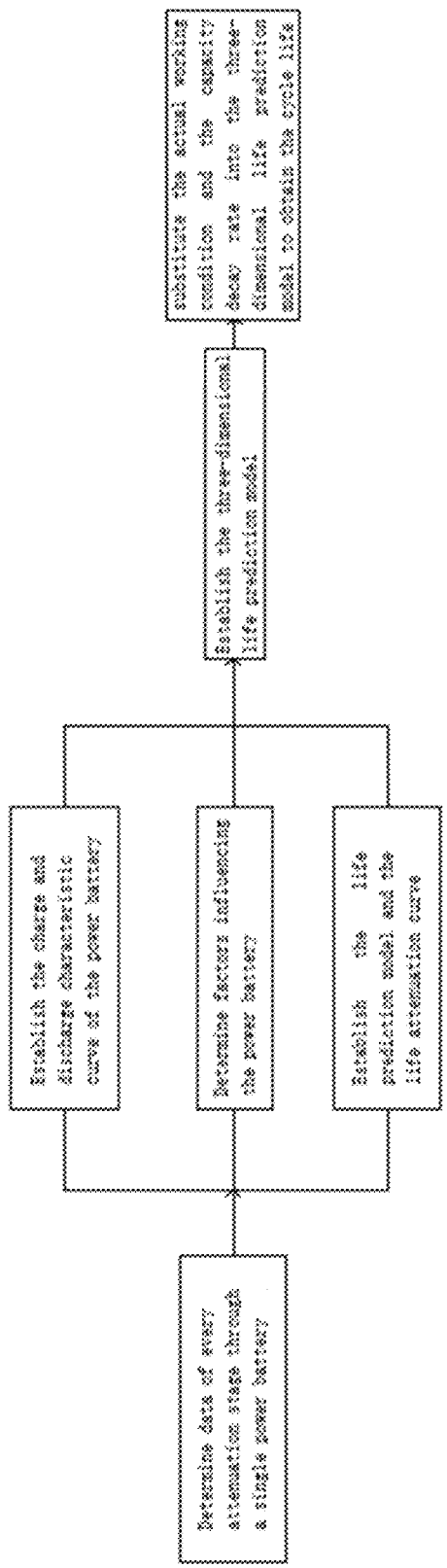
FIG. 1 is a structural block diagram of a service life prediction method provided by an embodiment of the present disclosure.
Figure 2:
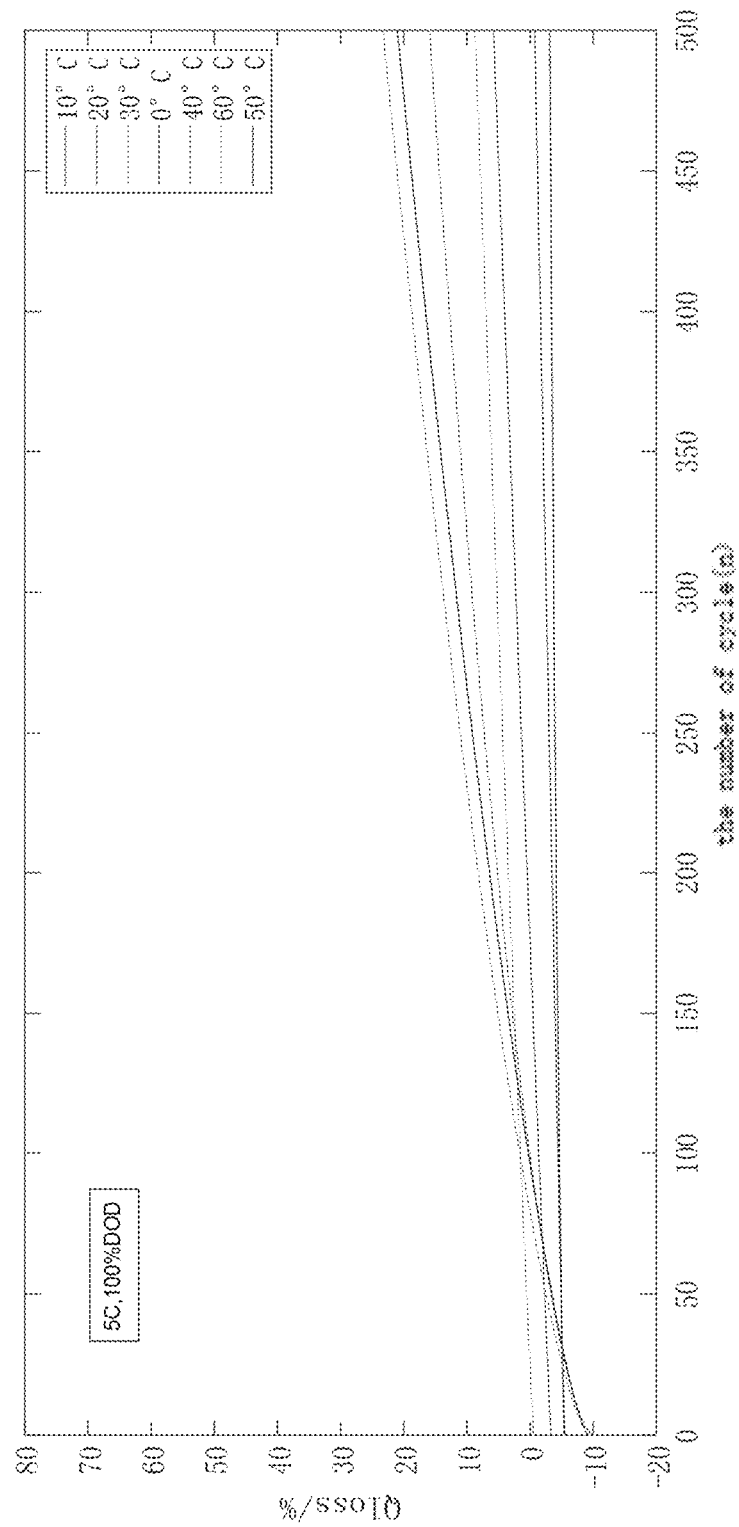
FIG. 2 is a life attenuation curve when the discharge rate is 5C provided by an embodiment of the present disclosure.
Figure 3:
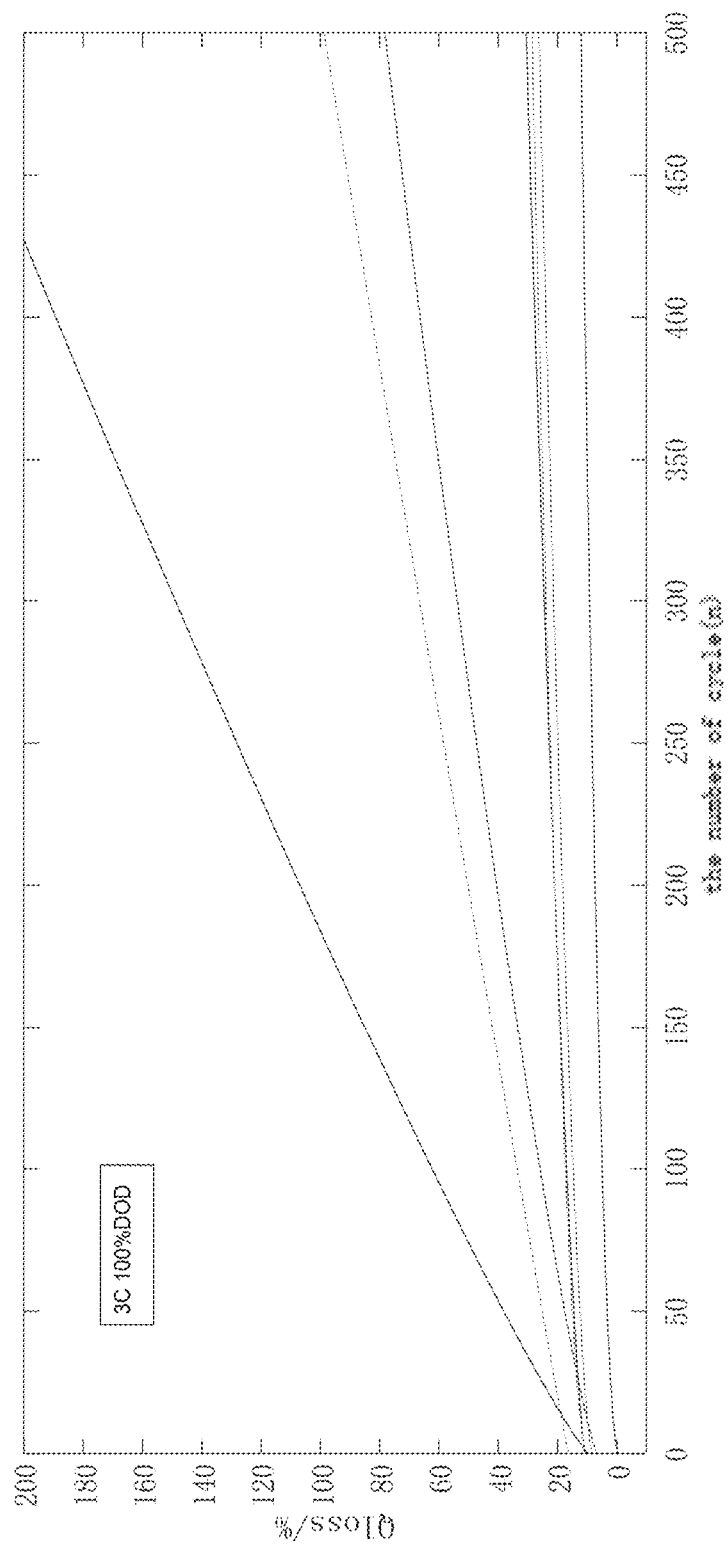
FIG. 3 is a life attenuation curve when the discharge rate is 3C provided by an embodiment of the present disclosure.
Figure 4:
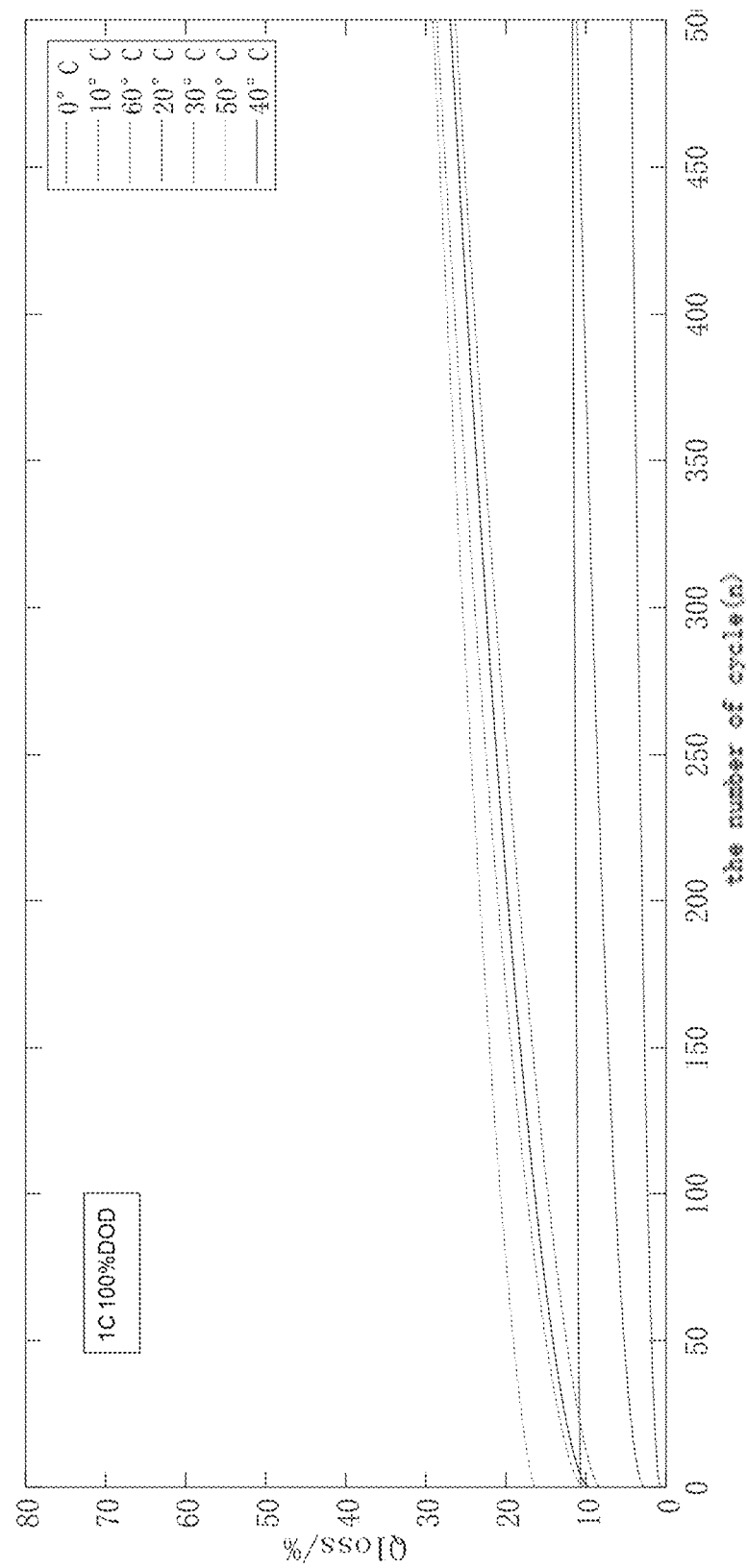
FIG. 4 is a life attenuation curve when the discharge rate is 1C provided by an embodiment of the present disclosure.

As shown in FIG. 2, FIG. 3, and FIG. 4, according to the number of cycles n and the corresponding capacity loss rate $Q_{loss}$, the life attenuation curve at the discharge rate of 1 C, 3 C, 5 C and at the experimental temperature of 0, 10, 20, 30, 40, 50, 60 is plotted.

The life prediction model is established by analyzing factors affecting the service life of the power battery. Factors affecting the cycle life of the power battery mainly include temperature T, discharge rate C and discharge depth DOD. Therefore, an influence factor is utilized to establish the service life attenuation model of the power battery, due to a functional relationship between the cycle life of the power battery and the temperature, rate of discharge, the depth of discharge. The capacity attenuation rate is a function of its parameter set $f$. Therefore, the cycle life model of the power battery is expressed as: $Q_{loss} = f(T,C,DOD,t)$, where t is the cycle time. As a result, the change of capacity loss rate $Q_{loss}$ and the cycle life N have a functional relationship. The model of the capacity loss rate is used to represent the cycle life model of the power battery, according to the above-mentioned conclusion. The preset discharge depth is 100%. The cycle life model of the power battery is simplified as: $Q_{loss} = f(T,C,t)$. According to the research, the characteristics of a power battery cycle life attenuation rule conform to a power function. The power exponential model of the power battery cycle life attenuation is expressed as: $Q_{loss} = x^\mu + d$, where d is a temperature constant, and $\mu$ is a power function factor. Temperature is considered to be the main factor of the attenuation of power battery, and the cycle life of the power battery is predicted only by the power battery cycle life method based on the function of the capacity loss rate $Q_{loss} = f(T)$, often leading to large prediction errors. According to the invention, the influence of temperature is considered on the basis of the power function model, and a mathematical model is expressed as follows:

$$Q_{loss} = B \cdot e^{(K_a K_T K_C + b)} \cdot Q^\alpha + d,$$

where B is a coefficient, $K_\alpha$ is a function related to the activation energy, $K_T K_C$ is the $Q_{loss}$ function which is affected by the temperature T and the discharge rate C, and the unit of $K_T K_C$ is KJ•mol$^{-1}$•K$^{-1}$. $\alpha$ is a power function factor, Q is the discharge capacity $Q = n \cdot C$ in the experiment, T is the thermodynamic temperature and b is a constant.

Since the power function factor $\alpha$ does not basically change under any value of discharge rate C, temperature T and discharge depth DOD, the average value of $\alpha$ is 0.287. Under different charge and discharge rates, the activation energy a of the power battery is expressed as: $a = 3116 - 170 \cdot C$, and the unit for a is KJ•mol$^{-1}$. When the discharge rate C is a constant value, the discharge capacity Q is positively correlated with the number of discharge cycles n, and the relationship between the discharge capacity Q and the discharge cycle number n is expressed as: $Q = n \cdot C$, where n is the number of discharge cycles. The power battery life prediction model can be finally determined as: $Q_{loss}(f) =$ $Be^{(-lg(3116-170 \cdot C) \cdot T \cdot C)}(n \cdot C)^{0.287} + c$. The value of B at the discharge rate of 1C, 3C and 5C is 66.8, 172.3 and 326.8, respectively.

Figure 5:
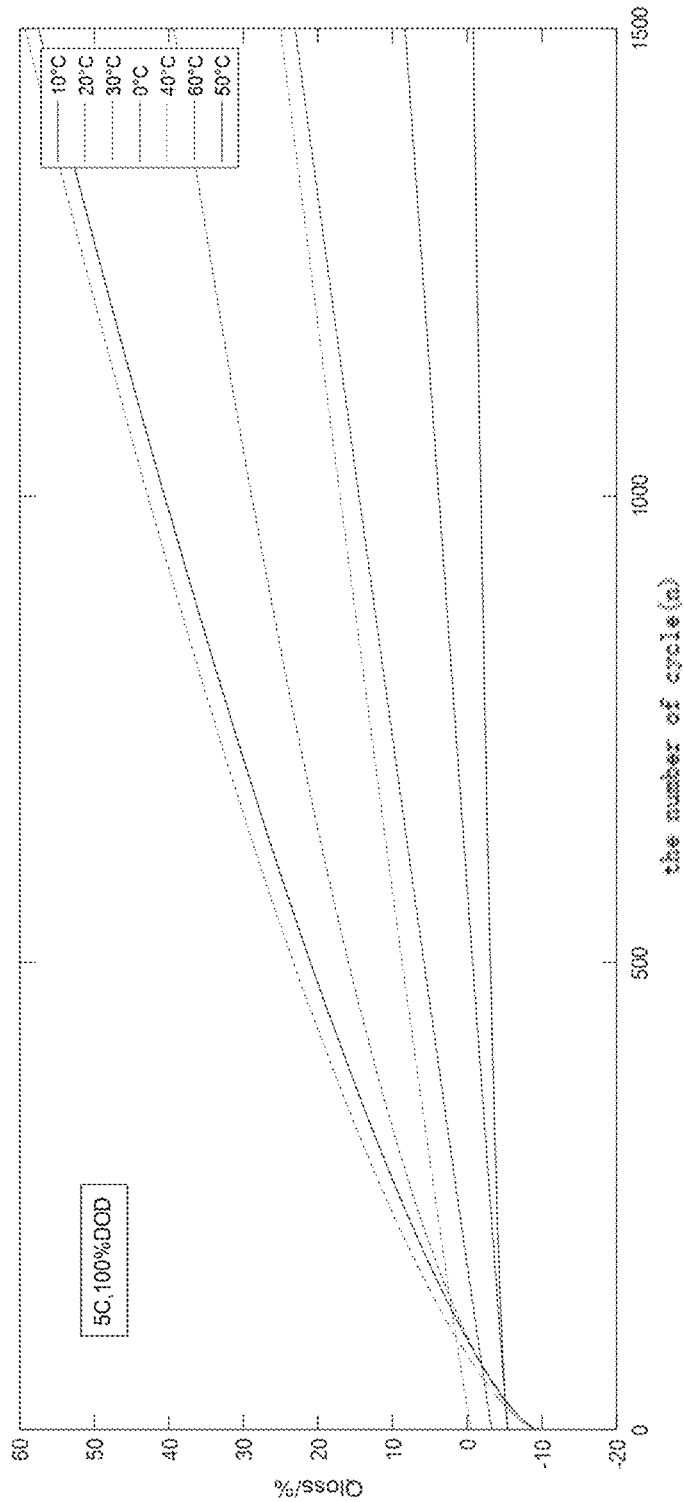
FIG. 5 is a fitting result when the discharge rate is 5C provided by an embodiment of the present disclosure.
Figure 6:
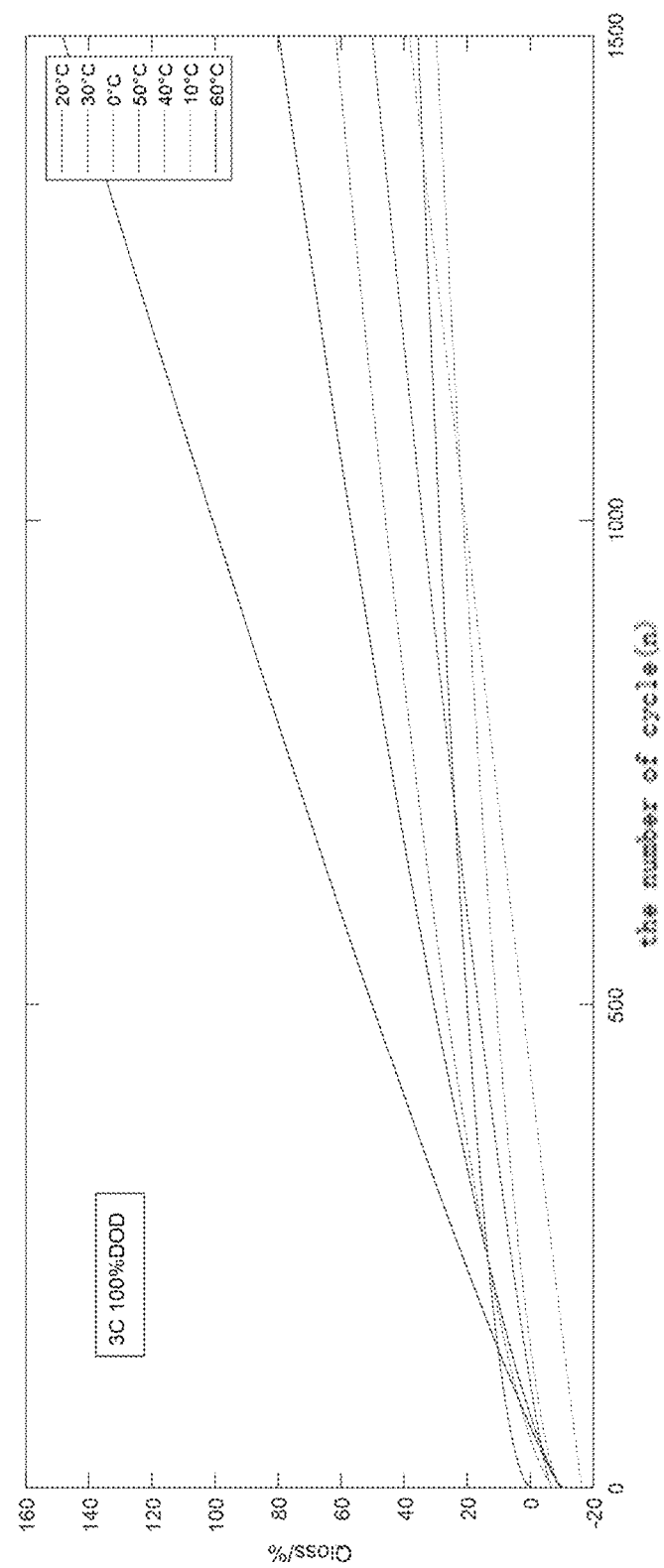
FIG. 6 is a fitting result when the discharge rate is 3C provided by an embodiment of the present disclosure.
Figure 7:
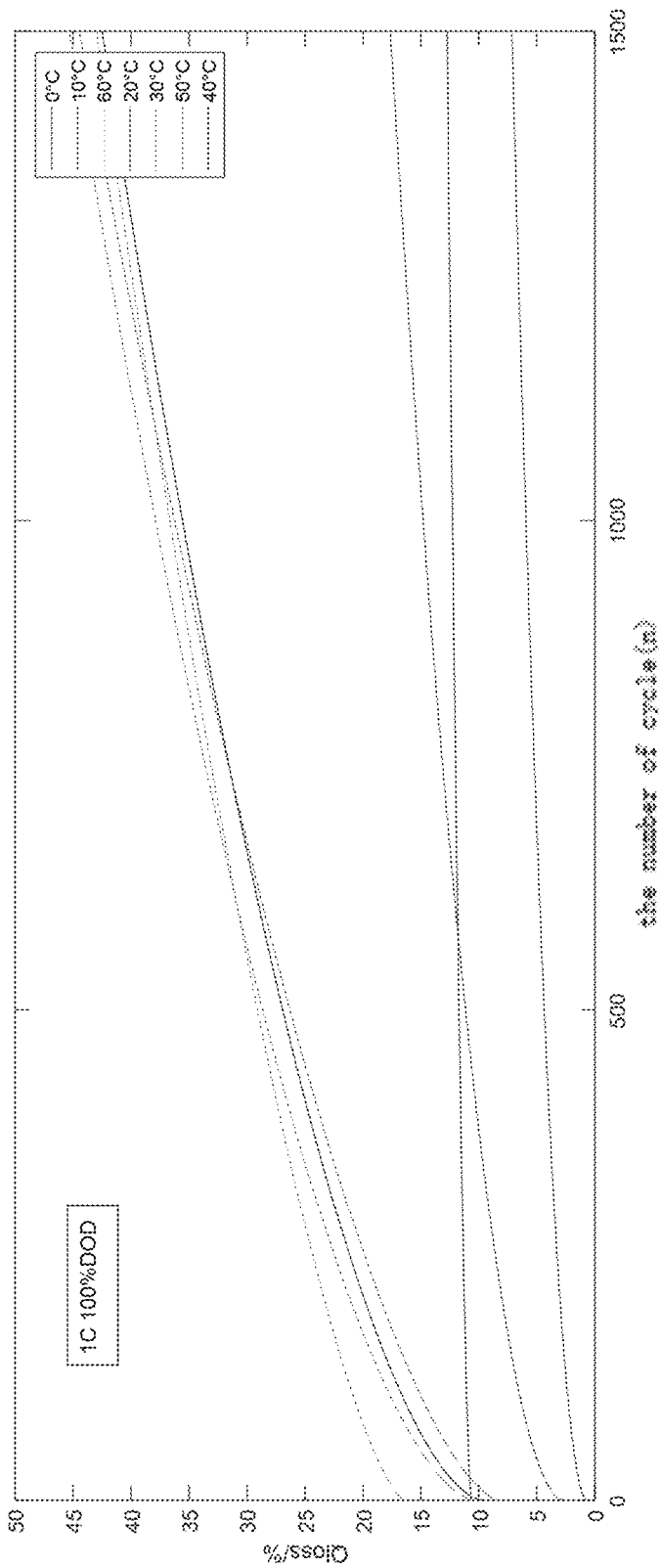
FIG. 7 is a fitting result when the discharge rate is 1C provided by an embodiment of the present disclosure.

A life prediction model is established according to factors influencing the service life of the power battery, and the life prediction model is fit with the life attenuation curve. The fitted curve is shown in FIGS. 5, 6 and 7. The attenuation rate of the power battery is influenced by the temperature T and the discharge rate C. The capacity attenuation of the power battery increases faster with the increase of the temperature T value under the current experimental conditions. Fitting the service life attenuation model of the power battery with the battery capacity attenuation rate, the error rate of the prediction model is controlled within a range. The service life attenuation model of the power battery better reflects the actual capacity attenuation rate of the battery.

Figure 8:
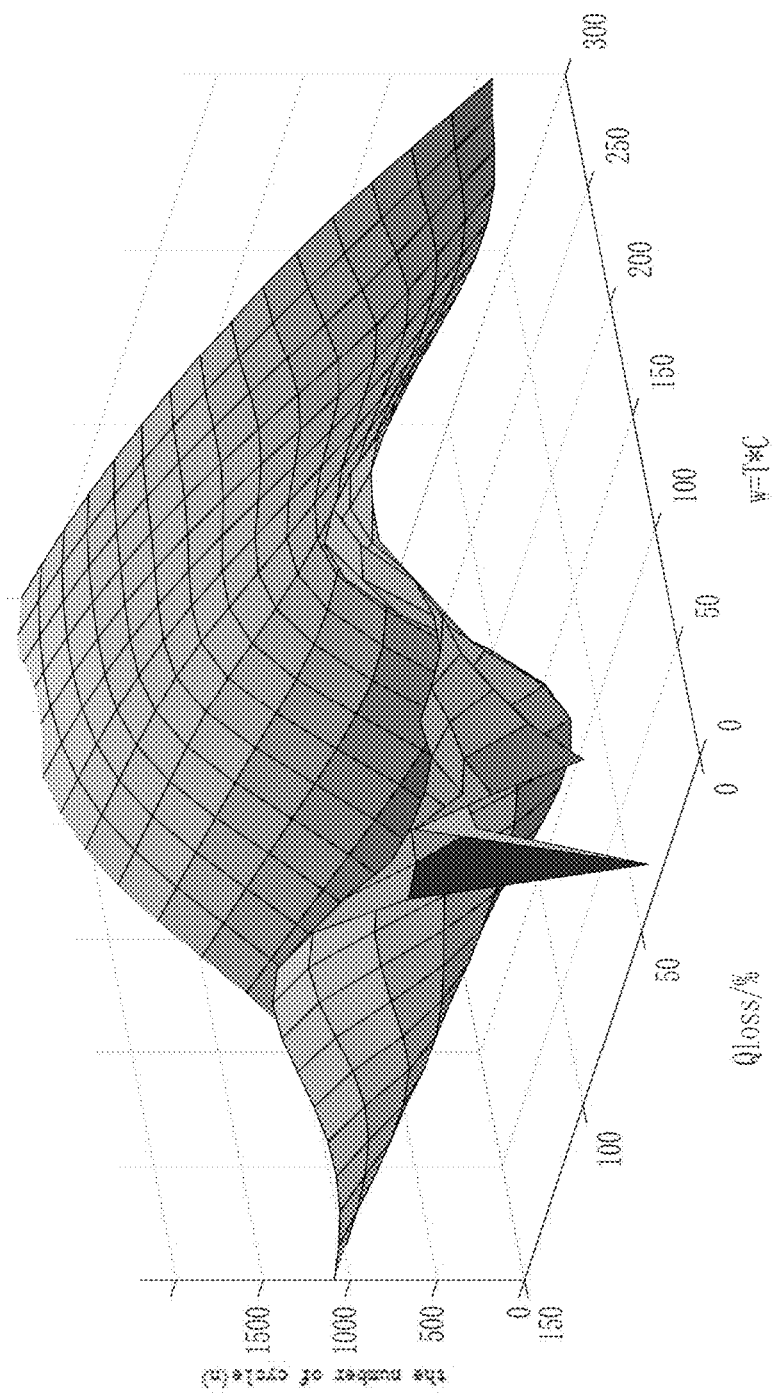
FIG. 8 is a three-dimensional model diagram provided by an embodiment of the present disclosure.

According to the fitted curve, the cycle life N corresponding to the capacity loss rate under each working condition is obtained. MATLAB may be used to draw a three-dimensional scatter diagram about the product ω of the discharge rate and the temperature, the capacity loss rate $Q_{loss}$ and the cycle life N. The three-dimensional scatter diagram may be fit into a three-dimensional graph via interpolation, as shown in FIG. 8.

When using the three-dimensional model for predicting the remaining life of the retired power battery of the same type, the only requirement is to obtain the product factor ω of the temperature and the discharge rate C under actual working conditions, and obtain the calculated capacity loss rate $Q_{loss}$. ω and $Q_{loss}$ may then be substituted into the established three-dimensional model, the cycle life N can be intuitively obtained, and the remaining life can be calculated by $N_{remain} = N_{nominal} - N$. Once the remaining life of the retired power battery is known, a user can know the timeline to utilize the retired power battery while still satisfying the battery performance, and can also know the timeline to replace the retired battery with a new battery so that the retired power battery can be utilized with low battery performance requirement and the battery performance can be enhanced with the new battery for a device, especially, new energy vehicles. The efficiency of the retired power battery can be much improved for the new energy vehicle.

Figure 9:
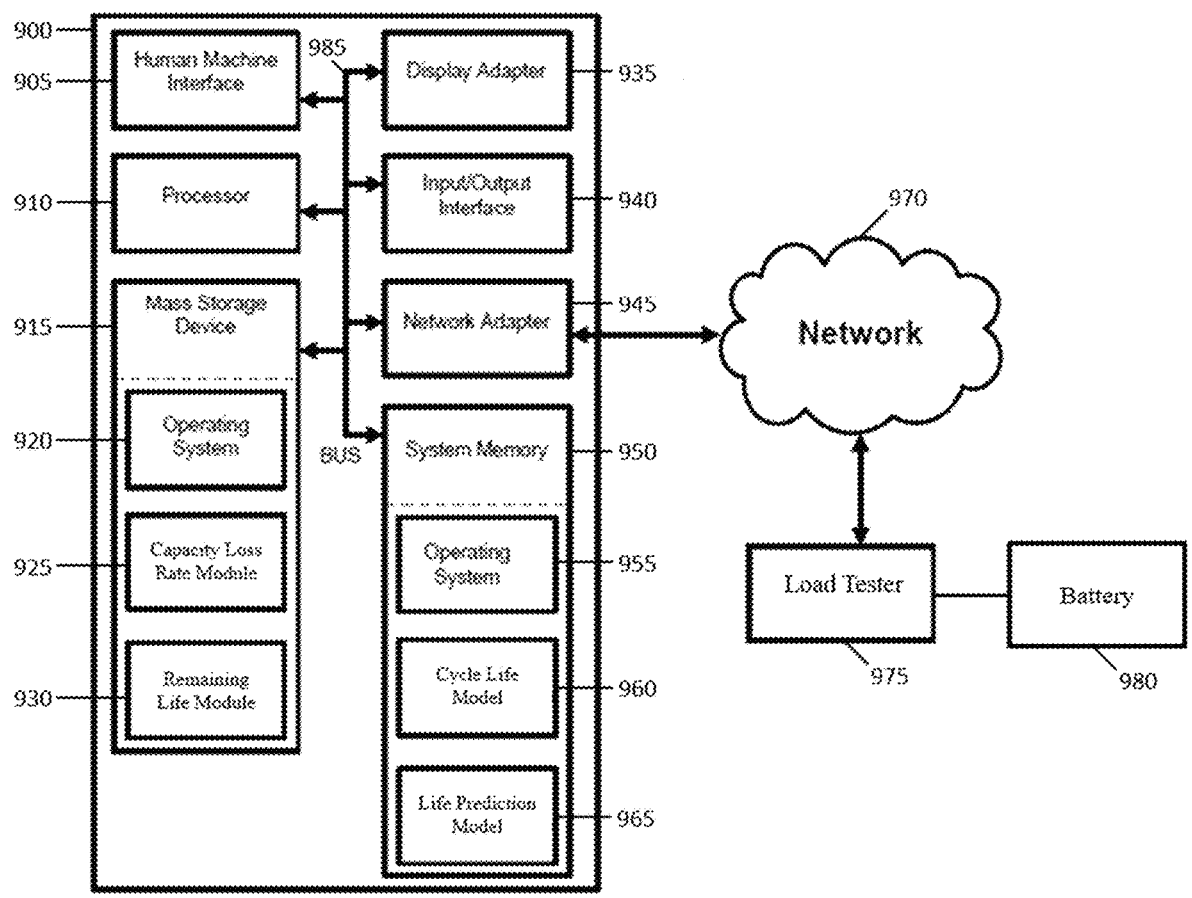
FIG. 9 is a block diagram illustrating an exemplary computing system in which the present system and method can operate provided by an embodiment of the present disclosure.

Referring to FIG. 9, the methods and systems of the present disclosure may be implemented on one or more computers, such as computer 900. The methods and systems disclosed may utilize one or more computers to perform one or more functions in one or more locations. The processing of the disclosed methods and systems may also be performed by software components. The disclosed systems and methods may be described in the general context of computer-executable instructions such as program modules, being executed by one or more computers or devices. For example, the program modules include operating modules such as Capacity Loss Rate Module 925, Remaining Life Module 930, and the like. Capacity Loss Rate Module 925 is configured to calculate a capacity loss rate of a battery according to remaining capacity, as in Step 2. Remaining Life Module 930 is configured to solve the difference between the cycle life and the nominal life to obtain the remaining life, as in Step 7. These program modules may be stored on mass storage device 915 of one or more computers devices, and may be executed by one or more processors, such as processor 910. Each of the operating modules may comprise elements of programming and data management software.

The components of the one or more computers may comprise, but are not limited to, one or more processors or processing units, such as processor 910, system memory 950, mass storage device 915, operating system 920 and 955, Input/Output Interface 940, display adapter 935, network adaptor 945, and system bus 985 that couples various system components. The one or more computers and Load Tester 975 may be implemented over a wired or wireless network connection at physically separate locations, implementing a fully distributed system. Additionally, Load Tester 975 may include the one or more computers such that Load Tester 975 and the one or more computers may be implemented in a same physical location. By way of example, without limitation, the one or more computers may be a personal computer, a portable computer, a smart device, a network computer, a peer device, or other common network node, and so on. Logical connections between one or more computers and Load Tester 975 may be made via network 970, such as a local area network (LAN) and/or a general wide area network (WAN).

Load Tester 975 may be configured to perform charge and discharge cycles at different discharge rates and temperatures of one or more batteries under test, such as battery 980, such as in Step 1. From the charge and discharge cycles, a cycle life experiment value and remaining capacity of the one or more batteries under test after the charge and discharge values may be obtained and communicated with the one or more computers, such as computer 900. Using the cycle life experiment value and remaining capacity, the one or more computers may be configured to establish life prediction model 965, such as in Step 4, and further cycle life model 960, such as in step S2. Load Tester 975 may be, for example, without limitation, a true load tester, a carbon load tester, or other such device capable of performing charge and discharge cycles of a battery at different discharge rates and temperatures.

It should be noted that each embodiment above is only used to illustrate rather than to limit the technical solutions of the embodiments of the present disclosure. Although the present disclosure has been described in detail with reference to the foregoing embodiments, those of ordinary skill in the art should understand that they can still modify the technical solutions described in the foregoing embodiments, or equivalently replace some or all of the technical features therein; and these modifications or replacements do not separate the essence of the corresponding technical solutions from the spirit and scope of the technical solutions of each of the embodiments of the present disclosure.

The invention claimed is:

1. A method for predicting a life of a retired power battery, comprising steps of:

Step 1, arranging power batteries as an experimental group, performing charge and discharge cycles at different discharge rates and different temperatures respectively, recording a life cycle experiment value and remaining capacity of a power battery after the charge and discharge cycles, and drawing a discharge characteristic curve under each working condition of the power battery;

Step 2, calculating capacity loss rate of the power battery in the experimental group under the life cycle and the working conditions, based on the remaining capacity of the power battery;

Step 3, generating a life attenuation curve under each working condition based on the life cycle experiment value recorded in Step 1 and the capacity loss rate obtained in Step 2;

Step 4, establishing a battery life prediction model based on factors influencing a service life of the power battery, and fitting the battery life prediction model with the life attenuation curve;

Step 5, acquiring the life cycle corresponding to the capacity loss rate under each working condition based on the fitted curve in Step 4;

Step 6, generating a three-dimensional graph based on a product of the discharge rate and a temperature, the capacity loss rate and the life cycle;

Step 7, determining a remaining service life of a same-type power battery as follows:

calculating the capacity loss rate and the product of the discharge rate and the temperature, substituting the product into the three-dimensional graph to obtain the life cycle, and then solving a difference between the life cycle and a nominal life to obtain the remaining life, determining a timeline to utilize the retired power battery while still satisfying battery performance and further determining the timeline to replace the retired power battery with another power battery once the remaining life of the retired power battery ends, thereby improving efficiency of utilizing the retired power battery and enhancing battery performance with the another power battery for new energy vehicles, wherein the process for establishing the battery life prediction model in Step 4 is as follows:

S1, considering factors that affect the life cycle of the response power battery, including the temperature T, the discharge rate C and a discharge depth DOD;

S2, determining that the discharge depth DOD is 100%, and establishing the battery life prediction model: $Q_{loss}=f(T,C,t)$;

S3, based on characteristics of a power battery life cycle attenuation rule conforming to a power function, further establishing the battery life prediction model: $Q_{loss}=x^\mu+d$, wherein the d is a constant of temperature and x is the power function;

S4, based on the influence of temperature, further establishing the battery life prediction model: $Q_{loss}=B \cdot e^{(K_a K_T K_C+b)} \cdot Q^\alpha+d$, wherein the B is a coefficient, $K_a$ is a function related to an activation energy, $K_T K_C$ is the function $Q_{loss}$ which is affected by the temperature T and the discharge rate C, $\alpha$ is a power function factor, Q represents the discharge capacity $Q=n \cdot C$ where n is a number of discharge cycles represents the temperature and b is a constant;

S5, based on a value of the power function factor $\alpha$ and the activation energy a, $\alpha=0.287$, $a=3116+170 \cdot C$, and determining the battery life prediction model: $Q_{loss}=B \cdot e^{(-lg(3116-170 \cdot C)) \cdot T \cdot C}(n \cdot C)^{0.287}+c$, wherein the c is the constant.

2. The method of claim 1, wherein the solving formula of capacity loss rate in Step 2 is $Q_{loss\ real}=\Delta Q/Q_\tau \times 100\%$, $Q_{loss\ real}$ is the capacity loss rate, $\Delta Q$ is the capacity attenuation amount of the battery, and $Q_\tau$ is rated capacity of the power battery; and the capacity attenuation amount of the battery is obtained by the formula: $\Delta Q=Q_\tau-Q_n$, and $Q_n$ is the remaining capacity of the battery after the cycle of n times.

3. The method of claim 1, wherein the establishing of the three-dimensional graph in Step 6 comprising the steps of:

drawing a three-dimensional scatter diagram, the three-dimensional scatter diagram is about the product of the discharge rate and the temperature, the capacity loss rate and the life cycle; and fitting the three-dimensional scatter diagram into the three-dimensional graph by using interpolation.

4. The method of claim 1, wherein the calculation formula of the remaining life in Step 7 is as follows: $N_{remain}=N_{nominal}-N$, the $N_{nominal}$ is the nominal life, and the N represents the life cycle.

\* \* \* \* \*